United States Patent [19]

Padgitt et al.

[11] 4,086,557
[45] Apr. 25, 1978

[54] VARIABLE RESISTANCE PRESSURE TRANSDUCER

[75] Inventors: Kenneth Warren Padgitt, Arlington Heights; Stanley Marion Kujawski, Lombard, both of Ill.

[73] Assignee: Motorola, Inc., Schaumburg, Ill.

[21] Appl. No.: 683,976

[22] Filed: May 6, 1976

[51] Int. Cl.² ............................................. H01L 10/10
[52] U.S. Cl. ...................................... 338/42; 338/145; 338/150
[58] Field of Search ................... 338/42, 36, 145, 150; 73/398 AR, 407 R, 419

[56] References Cited

U.S. PATENT DOCUMENTS

| 2,807,695 | 9/1957 | Delmonte | 338/150 |
| 3,333,223 | 7/1967 | Mucher | 338/145 |

FOREIGN PATENT DOCUMENTS

| 404,777 | 7/1966 | Switzerland | 338/145 |

Primary Examiner—C. L. Albritton
Attorney, Agent, or Firm—Phillip H. Melamed; James W. Gillman; Donald J. Lisa

[57] ABSTRACT

A variable resistance pressure transducer having high resolution, a wide resistance range and usable in conjunction with a limited linear actuation movement is provided. The transducer basically comprises a helical resistance element and a circular ring shaped contact arm which are mounted around a central axis and are slideably movable with respect to each other in directions parallel to the central axis. The ring contact essentially forms the wiper arm of a potentiometer assembly and the ring is dimensioned and positioned so that varying portions of its inner circumferential surface will contact the resistive element during relative linear axial movement between the ring and resistive element. This results in moving the effective point of contact between the ring and resistive element continously along the surface of the helical resistive element in response to the relative axial movement. The pressure transducer includes a pressure sensing diaphragm assembly which is linearly displaced by an amount related to the magnitude of the pressure being sensed. The diaphragm displacement results in changing the relative position of the ring contact with respect to the resistive element. Thus a pressure transducer has been provided in which a pressure sensing diaphragm has produced a linear movement that results in a variable resistance being produced in response thereto.

20 Claims, 3 Drawing Figures

VARIABLE RESISTANCE PRESSURE TRANSDUCER

BACKGROUND OF THE INVENTION

The invention relates generally to the field of variable resistance devices and their use in pressure transducer assemblies. The invention more particularly relates to an improved variable resistance device which produces a high resolution, wide range, varying resistance in response to a limited linear movement and the use of this device in pressure transducers.

The most common variable resistance device used in the prior art is a rotatably adjustable potentiometer. In such devices a variable resistance is produced in response to the rotating of a wiper arm which electrically contacts a resistive element that is located between two end electrical contacts. Such devices are economical and perform satisfactorily when a rotary motion is available for rotating the wiper arm.

However, in many applications, such as in pressure transducers having a displaceable diaphragm, a short stroke linear motion is the only movement initially produced. The conversion of this short linear motion to a rotary motion and the subsequent use of rotary motion to drive a normal potentiometer would typically require many additional components and thereby increase the cost of a pressure transducer assembly and decrease its reliability. The cost would be increased since additional components would be required for the assembly. The use of these additional components would also increase the total size of the assembly. The reliability of the assembly would be decreased since the use of additional components increases the liklihood of a probable failure or malfunction of one of the components of the assembly.

Some prior art pressure transducer assemblies comprise a wound resistive element and a wiper arm. The wiper arm has a single contact area portion which is linearly moved in a direction parallel to the central axis of the resistor winding in response to the linear movement produced by a pressure sensing diaphragm. Typically, a fixed portion of the wiper arm is always in contact with a portion of the wound resistive element. As this portion of the wiper arm slides along the resistive element, less of the resistive element will exist between the wiper arm and an end contact portion of the wound resistive element. This results in the creation of a variable resistance. Typically, the pitch of the wound resistive element is equal to its width in the direction parallel to the axis about which the resistor is wound. Thus the adjacent turns of the resistor electrically contact each other and the resistor is effectively a solid cylinder of resistive material. These prior art assemblies can not produce both a high resolution and wide range variable resistance. If the pitch of the resistor is greater than its width, severe resolution problems occur, since the resistance can then be varied only in increments of a whole number of windings.

The distance that the wiper arm travels is directly related to the linear diaphragm motion which is typically half an inch. Therefore without any amplification or conversion of the diaphragm linear motion, only a short linear movement is available for the wiper arm. Thus the prior art systems have had to compromise their resistive resolution with their requirements for implementing a large resistive change over the range of typical pressures which are to be monitored by these transducers. These range and resolution problems could be solved by the conversion of the linear diaphragm motion to a rotary motion. However, as was mentioned previously, the conversion to rotary motion would increase the cost of the assembly, increase the size of the assembly, and decrease the reliability of the assembly.

One prior art pressure transducer system uses the linear diaphragm motion to linearly move a multiturn resistive element, having a pitch equal to its width, with respect to a wiper arm contacting surface that effectively forms a contact line which is skewed with respect to the central axis upon which the resistive element is wound. This skewed orientation of the wiper contact surface and the resistive element axis results in providing a short stroke pressure transducer which does effectively amplify the diaphragm motion and produce a larger range of resistive values with a higher degree of resolution. However, the resolution and resistive range of this particular system is still limited because of limitations on the size of the transducer assembly. Since the resistive element is still effectively linearly disposed and the effective contact point has a linear travel, the resistive resolution and range in this prior system is a function of the largest linear dimension of the pressure transducer. Thus the aforementioned prior art system, while representing an improvement over previous prior art systems, still must strike a balance between the range and resolution of the resistance values produced by the transducer and a linear dimension of the transducer. Typically, this improved transducer uses over 100 turns of helically wound resistive material having contacting adjacent windings and wound about a central axis.

The basic problem in all the prior art transducers is that only a short stroke linear motion is available for actuation of any variable resistance device. Attempts to convert this linear motion into rotary motion are excessively costly and decrease the reliability of the transducer assembly. Attempts to amplify the available linear motion, such as skewing the central axis of the resistance element with respect to the contact area of the wiper arm, have generally resulted in increasing the complexity, size and cost of the pressure transducer assembly while still only providing a compromise in the resistance range and resolution produced by the pressure transducer assembly.

SUMMARY OF THE INVENTION

An object of the present invention is to provide an improved and simplified variable resistance device which overcomes all of the aforementioned deficiencies of previous variable resistance devices used in conjunction with the linear motion produced by a pressure transducer.

Another object of the present invention is to provide an improved and simplified pressure transducer assembly which produces a high resolution and large range variable resistance output in response to the pressure being sensed without unduly increasing the size of the transducer.

Still another object of the present invention is to provide an improved and simplified pressure transducer assembly which uses a metallic coil spring for internal electrical connections.

A more specific object of the present invention is to provide an improved variable resistance device in which a linear movement is used to provide a change in the relative position between a ring contact wiper arm and a helically wound resistive element whereby relative movement of the ring contact and resistive element results in continuously helically moving the effective contact point between the ring and resistive element along the entire surface of the helical resistive element and thereby providing a high resolution variable resistance device which is usable with a limited linear actuating movement.

In an embodiment of the present invention an improved variable resistance device adaptable for use in a pressure transducer is provided. The resistance device includes at least one resistor which is helically wound about a central axis and has first and second end portions having electrical contacts coupled thereto. A ring shaped contact means is positioned around the central axis of the helical resistor and is located between the end portions of the resistor. The ring contact means has a circumferential surface for electrically contacting the helical resistor and is linearly slideable with respect to it in directions which are parallel to the central axis of the resistor. The resistor and ring contact means are positioned such that the ring will circumferentially contact the resistor during relative axial movement of the ring with respect to the resistor. This results in continuously moving the effective contact point between the ring and to the resistor along the surface of the helical resistor in response to changes in the relative position of these components. Thus a high resolution variable resistance device is provided which can be actuated with a short stroke limited linear movement. The present invention effectively amplifies the linear actuation movement without unduly increasing the size of the variable resistance device.

Specifically, the ring contact means is positioned such that varying portions of its circumferential surface will contact the resistive element during any relative axial movement of the ring contact means with respect to the resistor. This positioning is accomplished by having the central axis of the helical resistor coincide with the central axis of the ring and by having the ring means having an inner, or outer, diameter which is substantially equal to the inner or outer diameter formed by the helically wound resistor element.

In addition, the pitch of the helically wound resistor is said to be greater than the width of the helical resistor measured in a direction parallel to the central axis. This limitation distinguishes the present invention from practically all of the prior art resistive assemblies, since the majority of these assemblies are helically wound with no space between their adjacent windings and are therefore effectively a solid cylindrical resistive body.

Also, the present invention provides an improved pressure transducer which uses the aforementioned variable resistance device to produce a high resolution variable resistance output in response to the linear displacement of a pressure sensing diaphragm apparatus. The pressure transducer also uses coil springs not only to bias and position the mechanical elements of the transducer assembly but also to form part of the electrical circuitry in the pressure transducer. By the use of coil springs as part of the electrical circuitry, a wireless pressure transducer has been provided.

BRIEF DESCRIPTION OF THE DRAWINGS

For a more complete understanding of the invention reference should be made to the drawings, in which.

DESCRIPTION OF THE PREFERRED EMBODIMENT

Figure 1:
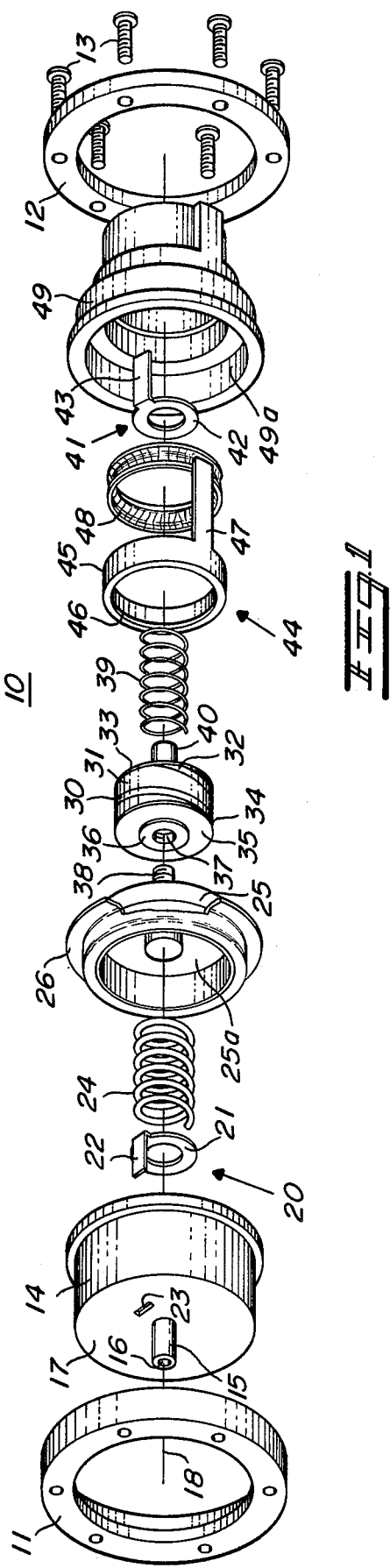
FIG. 1 is an exploded perspective view of an improved pressure transducer which uses an improved variable resistance device that is actuated by limited linear movement.
Figure 2:
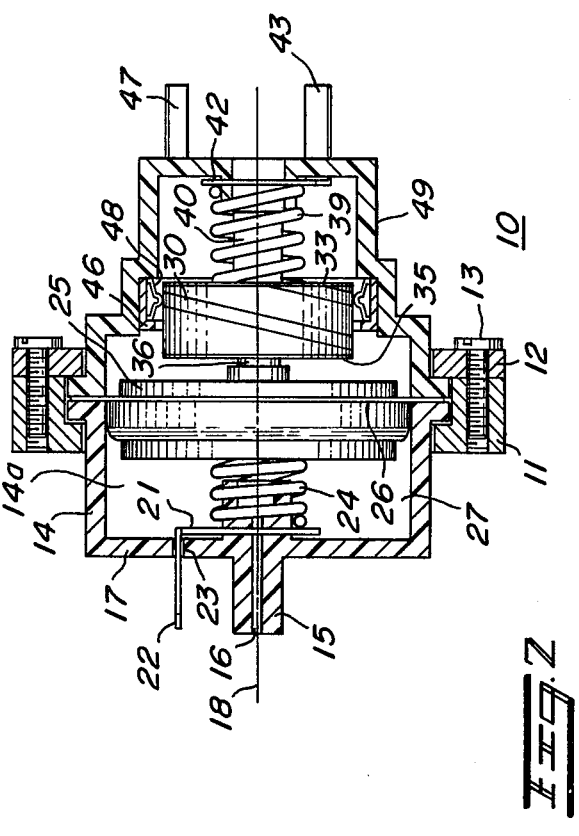
FIG. 2 is an assembled planar view of the pressure transducer illustrated in FIG. 1 with several parts shown in cross section for clarity.

FIGS. 1 and 2 illustrate an improved pressure transducer 10 which senses pressure magnitude and produces a variable resistance proportional to the magnitude of the pressure being sensed. The term pressure as used herein refers to both positive and negative (vacuum) pressure. Thus the pressure transducer 10 is contemplated as being suitable for use in sensing the vacuum manifold pressure produced by the internal combustion engine of a vehicle.

The pressure transducer 10 includes a pair of mating outer metallic ring shaped clamping brackets 11 and 12 which along with six retaining screws 13 hold together the component parts which comprise the pressure transducer 10. A plastic cup shaped member 14 forms part of the outer housing of the pressure transducer 10 and has a cylindrical outward projection 15 with a cylindrical bore 16 formed on an end surface 17 of the housing member 14. It is contemplated that a tubing member (not shown) will be coupled to the end projection 15 and convey the pressure to be sensed to the internal portion (14a) of the cup member 14. The cylindrical projection 15 is located about a central axis 18 of the cup member 14. This central axis forms the central axis for the entire pressure transducer assembly and the location of all the components of the pressure transducer 10 will be specified with respect to this axis. Generally, all substantially cylindrically shaped members of the pressure transducer assembly will be located such that their central axis will be coincident with the central axis 18.

A first electrical terminal 20 comprises a ring portion 21 and an outwardly extending portion 22 which extends through the surface 17 through a slot 23 therein. The projection 22 is contemplated as being fit into the slot 23 such that substantially no air gap exists in the slot after the assembly of the pressure transducer. This can be accomplished by a press fit or by the subsequent application of a sealing material in the slot 23. The ring portion 21 of the terminal 20 is located within the internal cavity 14a formed by the cup member 14 and has its central axis coincident with the axis 18. A metallic coil spring 24 is positioned adjacent to the ring portion 21 and has its central axis coincident with the axis 18. The coil spring 24 mechanically and electrically couples the ring terminal 20 to a cup shaped metallic member 25 which forms an internal cavity 25a that faces the internal cavity of cup member 14. The spring 24 mechanically positions elements 14 and 20 with respect to cup 25 while electrically coupling components 20 and 25. A ring shaped outer rubber gasket 26 is attached to the metallic cup member 25 and the members 25 and 26 together form a diaphragm assembly for the pressure transducer 10. The internal cavities of the cup members 25 and 14 generally form a chamber 27 (see FIG. 2) which is substantially air-tight with the exception of the center bore hole 16. Pressure changes are coupled through this center bore hole and effectively result in the displacement of the transducer diaphragm assembly in response thereto in directions parallel to the central axis 18. Thus the transducer 10 produces a displacement of the diaphragm in response to the pressure being sensed, the magnitude of the displacement being related to the magnitude of the pressure and the displacement being a short stroke linear limited movement of the metallic cup member 25 along the central axis 18.

A resistive element 30 is helically wound on an insulating cylindrical core 31 and both have their central axes coincident with the central axis 18. The resistive element 30 has a first end portion 32 electrically connected to a metallic end disk 33 which is attached to one end of the insulating core 31. A second end portion 34 of the helical resistive element 30 is connected to a metallic end disk 35 which is attached to the other end of the insulating core 31. A brass bushing 36 is inset into the insulating core 31 at the same end as the metallic disk 35 and has a threaded interior cavity 37 which matingly engages a threaded metal projection 38 that is outwardly extending from the end surface of the metallic cup 25. Thus the cup 25 is electrically connected to the end portion 34 of the helical resistive element and the other end of the helical resistive element is connected to the end disk 33.

The pitch of the helical resistive element 30 is greater than the width of the helical resistive element as measured in a direction parallel to the central axis 18. The term pitch, as commonly used, refers to the distance between any one point on a winding and the corresponding point on an adjacent winding measured in a direction parallel to the central axis of the winding. By specifying that the pitch of the helical resistor 30 is greater than the width of the helical resistor as measured in a direction parallel to the axis 18, this precludes the possibility of having the adjacent windings of the resistor contacting each other and thereby effectively forming a continuous tube of resistive material rather than a helically wound resistor having spaced and insulated adjacent windings.

A metallic coil spring 39 is electrically and mechanically coupled to the end contact disk 33 and is guided into position by an outwardly extending projection 40 which is attached to the end disk 33. The coil spring 39 forms a mechanical and electrical connection between the end disk 33 and a metallic end contact terminal 41 which comprises a metal ring 42 and an outwardly extending metal projection 43, the central axis of the ring 42 being coincident with the central axis 18. The coil 39 mechanically positions and biases the terminal 42 with respect to the disc 33 and helical resistor 30.

A central wiper arm terminal 44 comprises a cylindrically shaped metallic ring 45 with one edge of the metallic ring having a retaining ridge 46 and an outwardly directed metallic projection 47 attached to the ring 45. A metallic circular contact ring 48 comprising a series of inwardly directed flexible metallic projections is positioned within the terminal cylinder 45 retained in place by the ridge 46 and effectively forms an inner circumferential surface which contacts the resistive element 30. Thus the inner diameter of the ring 48 is substantially equal to the outer diameter of the core 31 plus twice the thickness of the resistive element 30 in a direction perpendicular to the central axis 18. The ring 48 is positioned between the first and second end portions (32 and 34) of the helical resistor 30 and has a circumferential surface, its inner diameter, for electrically contacting this resistive element. The core 31 and helical resistor 30 are linearly slideable with respect to the contact ring 48 along the axis 18. An outer plastic housing 49 is generally cup shaped and forms an internal cavity 49a which encloses the components 30-48 with the exception of the outwardly extending projections 43 and 47 which protrude from the housing 49 through associated slot openings in the housing.

FIG. 2 illustrates the pressure transducer 10 with components 11, 12, 14, 15, 46, 48 and 49 shown in cross section and all other components illustrated in a planar view.

The operation of the pressure transducer illustrated in FIGS. 1 and 2 will now be described in detail. The transducer essentially consists of a three terminal electrical device which produces a variable resistance in response to different pressures being sensed.

Figure 3:
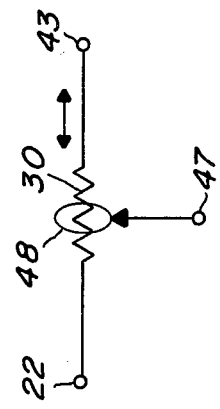
FIG. 3 is schematic diagram of the equivalent electrical circuit for the pressure transducer illustrated in FIGS. 1 and 2.

An electrical schematic of the pressure transducer 10 is illustrated in FIG. 3. The components illustrated in FIG. 3 are identified by numbers corresponding to the physical components illustrated in FIGS. 1 and 2. A resistive element corresponding to the helical resistor 30 is connected between two end terminals corresponding to the outward projections 22 and 43. A central wiper arm terminal corresponding to outward projection 47 is illustrated as being electrically connected to a central wiper arm contact corresponding to the metallic contact ring 48.

Basically, the pressure transducer 10 operates by producing a displacement of the metallic cup 25 in response to the pressure being sensed, the magnitude of the displacement being proportional to the magnitude of the pressure. The direction of the displacement of cup 25 is parallel to the central axis 18. The displacement of the metallic cup 25 results in the linear short stroke movement of the helical resistor 30 and core 31 along the axis 18. The clip ring 48 and helical resistive element 30 are linearly slideable with respect to each other in directions parallel to the central axis 18. The clip ring 48 is maintained in a fixed position with respect to the housing member 49 by the inner ridge 46 of the terminal 44. Thus the linear axial movement of the helical resistor 30 results in changing the relative position of the resistor 30 with respect to the clip ring 48. This effectively results in changing the resistance between the wiper arm projection 47 and either of the end projections 22 or 43.

The movement of the resistive element 30 with respect to the clip ring 48 results in continuously moving the effective contact point of the ring in a helical direction along the surface of the helical resistor. Specifically, changing the relative positions of the clip ring 48 and the helical resistor 30 results in having varying portions of the inner circumferential surface of the clip ring 48 contact the resistor 30 during the relative movement of these components. Thus effectively, the relative linear axial movement of these components results in having the effective contact point of a wiper arm travel along the outer surface of the helical resistor 30. Therefore a short linear actuation stroke has resulted in an effective amplified helical motion of a contact point without rotating any of the components of the pressure transducer and without any large increase in the size of the transducer. This result provides a high resolution variable resistance output for a pressure transducer which is actuated by the linear movement produced by the displacement of a pressure sensing diaphragm. No conversion of the linear actuation motion to a rotary actuation motion is required by the present invention.

Amplification of the linear actuation motion is accomplished by the positioning of the helical resistor 30 in combination with the ring contact 48. In addition, metallic springs have been used to provide mechanical bias for the positioning of the elements of the pressure transducer as well as forming part of the electrical circuitry of the pressure transducer.

While we have shown and described a specific embodiment of the present invention, further modifications and improvements will occur to those skilled in the art. One such modification would be to have the helical resistive element 30 fixed with respect to the housing of the transducer and have the contact ring 48 movable in response to the axial motion of the diaphragm assembly. Another such modification would be to construct the helical resistor 30 in a coil spring shape without the use of an insulating core and provide an inner contact ring having an outer circumference which circumferentially contacts the inner surfaces of the helical resistor. These modifications and all others which retain the basic and underlining principals disclosed and claimed herein are within the scope of this invention.

We claim:

1. An improved variable resistance device adaptable for use in a pressure transducer, said device comprising:
    housing means for said variable resistance device;
    at least one resistive element helically wound about a central axis, said resistive element having first and second end portions;
    first and second electrical contacts electrically coupled to said first and second end portions of said resistive element, respectively;
    at least one circular ring shaped electrical contact means positioned with its axis substantially coincident with said central axis, said ring contact means located between said first and second end portions and having a circular circumferential surface around said axis for electrically contacting said resistive element;
    spring bias means for positioning one of said resistive element and said ring contact means along said central axis with respect to said housing means, the other one of said resistive element and said ring contact means being fixed with respect to said housing means;
    said one of said resistive element and said ring contact means positioned by said spring bias means being directly linearly slideable with respect to said housing means in directions parallel to said central axis, and said ring contact means being positioned for electrically contacting said resistive element with its circumferential surface during relative movement of said ring contact means with respect to said resistive element in directions parallel to said central axis,
    whereby the relative movement results in continuously moving the effective contact point of the ring contact means helically along the surface of the helical resistive element, therefore providing a high resolution, wide resistance range, variable resistance device usable with a linear actuation movement.

2. An improved variable resistance device according to claim 1 which includes an external electrical terminal fixed with respect to said housing means and at least one metallic coil spring means for electrically coupling said one of said resistive element and said ring contact means positioned by said spring bias means to said external electrical terminal, said spring bias means including said coil spring means.

3. An improved variable resistance device adaptable for use in a pressure transducer, said device comprising:
    housing means for said variable resistance device;
    at least one resistive element helically wound about a central axis, said resistive element having first and second end portions;
    first and second electrical contacts electrically coupled to said first and second end portions of said resistive element, respectively;
    at least one ring shaped contact means positioned around said central axis and between said first and second end portions, said ring contact means having a circular circumferential surface around said axis for electrically contacting said resistive element;
    spring bias means for positioning one of said resistive element and said ring contact means along said central axis with respect to said housing means, the other one of said resistive element and said ring contact means being fixed with respect to said housing means;
    said one of said resistive element and said ring contact means positioned by said spring bias means being directly linearly slideable with respect to said housing means in directions parallel to said central axis, and said ring contact means being positioned for causing varying portions of said circumferential surface to contact said resistive element during relative movement of said ring contact means with respect to said resistive element in directions parallel to said central axis,
    whereby the relative movement results in continuously moving the effective contact point of the ring contact means along the surface of the helical resistive element and therefore providing a high resolution, wide resistance range, variable resistance device usable with a linear actuation movement.

4. An improved variable resistance device according to claim 3 which includes an external electrical terminal fixed with respect to said housing means and at least one metallic coil spring means for electrically coupling said one of said resistive element and said ring contact means positioned by said spring bias means to said external electrical terminal, said spring bias means including said coil spring means.

5. An improved variable resistance device according to claim 4 wherein said helical resistive element has a pitch greater than the width of the resistive element in a direction parallel to said central axis.

6. An improved variable resistance device according to claim 3 wherein said helical resistive element has a pitch greater than the width of the resistive element in a direction parallel to said central axis.

7. An improved variable resistance device according to claim 6 which includes an insulating cylindrically shaped core upon which said resistive element is mounted, said core having an outer diameter.

8. An improved variable resistance device according to claim 7 wherein said ring contact means comprises a metallic component substantially circular in shape which has an inner diameter substantially equal to the outer diamter of said core plus twice the thickness of said resistive element in a direction perpendicular to said central axis, said circumferential surface of said ring contact means substantially coinciding with said inner diameter of said metallic component.

9. An improved variable resistance device according to claim 8 which includes a housing for the variable resistance device, said ring contact means being stationary with respect to said housing and said resistive element being axially movable with respect to said housing in directions parallel to said central axis.

10. An improved pressure transducer for sensing pressure magnitude and producing a variable resistance in response thereto, said transducer comprising in combination:
housing means for said transducer;
pressure sensing means for producing a linear displacement of a body with respect to said housing means in response to a pressure being sensed, the magnitude of the displacement being related to the magnitude of the pressure being sensed;
at least one resistive element helically wound about a central axis, said resistive element having first and second end portions;
first and second electrical contacts electrically coupled to said first and second end portions of said resistive element, respectively;
at least one ring shaped electrical contact means positioned around said central axis and between said first and second end portions, said ring contact means having a circular circumferential surface around said axis for electrically contacting said resistive element;
spring bias means for positioning one of said resistive element and said ring contact means along said central axis with respect to said housing means, the other one of said resistive element and said ring contact means being fixed with respect to said housing means;
said one of said resistive element and said ring contact means positioned by said spring bias means being directly linearly slideable with respect to said housing means in directions parallel to said central axis in response to the displacement of said pressure sensing body, and said ring contact means being positioned for causing varying portions of said circumferential surface to contact said resistive element during relative movement of said ring contact means with respect to said resistive element in directions parallel to said central axis,
whereby the relative movement results in continuously moving the effective contact point of the ring contact means along the surface of the helical resistive element, therefore providing a high resolution, wide resistance range, variable resistance output for the improved pressure transducer.

11. An improved pressure transducer according to claim 10 which includes an external electrical terminal fixed with respect to said housing means and at least one metallic coil spring means for electrically coupling said one of said resistive element and said ring contact means positioned by said spring bias means to said external electrical terminal, said spring bias means including said coil spring bias means.

12. An improved pressure transducer according to claim 10 wherein said displaceable body of said pressure sensing means includes a diaphragm assembly which is mechanically coupled to said resistive element for linear movement of said resistive element in a direction parallel to said central axis.

13. An improved pressure transducer according to claim 12 wherein said helical resistive element has a pitch greater than the width of the resistive element in a direction parallel to said central axis and wherein insulating space exists between adjacent windings of said resistive element, said pressure transducer including an insulating cylindrically shaped core upon which said resistive element is mounted, said core having an outer diameter.

14. An improved pressure transducer according to claim 13 wherein said ring contact means comprises a metallic component substantially circular in shape which has an inner diameter substantially equal to the outer diameter of said core plus twice the thickness of said resistive element in a direction perpendicular to said central axis, said circumferential surface of said ring contact means substantially coinciding with said inner diameter.

15. An improved pressure transducer for sensing pressure magnitude and producing a variable resistance in response thereto, said transducer comprising in combination:
housing means for said transducer;
pressure sensing means for producing a linear displacement of a body with respect to said housing means in response to a pressure being sensed, the magnitude of the displacement being related to the magnitude of the pressure being sensed;
at least one resistive element helically wound about a central axis, said resistive element having first and second end portions;
first and second electrical contacts electrically coupled to said first and second end portions of said resistive element, respectively;
at least one circular ring shaped electrical contact means positioned with its axis substantially coincident with said central axis, said ring contact means located between said first and second end portions and having a circular circumferential surface around said axis for electrically contacting said resistive element;
spring bias means for positioning one of said resistive element and said ring contact means along said central axis with respect to said housing means, the other one of said resistive element and said ring contact means being fixed with respect to said housing means;
said one of said resistive element and said ring contact means positioned by said spring bias means being directly linearly slidable with respect to said housing means in directions parallel to said central axis in response to the displacement of said pressure sensing body, and said ring contact means being positioned for causing said circular circumferential surface to contact said resistive element during relative movement of said ring contact means with respect to said resistive element in directions parallel to said central axis,
whereby the relative movement results in continuously moving the effective contact point of the ring contact means along the surface of the helical resistive element, therefore providing a high resolution, wide resistance range, variable resistance output for the improved pressure transducer.

16. An improved pressure transducer according to claim 10 which includes first and second external electrical terminals and first and second metallic coil spring means for electrically coupling said first and second electrical contacts to said first and second electrical terminals, respectively, said first and second coil spring means being part of said spring bias means for positioning said resistive element along said central axis with respect to said housing.

17. An improved pressure transducer according to claim 15 which includes first and second external electrical terminals and first and second metallic coil spring means for electrically coupling said first and second electrical contacts to said first and second electrical terminals, respectively, said first and second coil spring means being part of said spring bias means for positioning said resistive element along said central axis with respect to said housing.

18. An improved variable resistance device according to claim 1 which includes first and second external electrical terminals and first and second metallic coil spring means for electrically coupling said first and second electrical contacts to said first and second electrical terminals, respectively, said first and second coil spring means being part of said spring bias means for positioning said resistive element along said central axis with respect to said housing.

19. An improved variable resistance device according to claim 3 which includes first and second external electrical terminals and first and second metallic coil spring means for electrically coupling said first and second electrical contacts to said first and second electrical terminals respectively, said first and second coil spring means being part of said spring bias means for positioning said resistive element along said central axis with respect to said housing.

20. An improved pressure transducer according to claim 15 which includes an external electrical terminal fixed with respect to said housing means and at least one metallic coil spring means for electrically coupling said one of said resistive element and said ring contact means positioned by said spring bias means to said external electrical terminal, said spring bias means including said coil spring bias means.

* * * * *